United States Patent
Park et al.

(10) Patent No.: US 9,796,373 B2
(45) Date of Patent: Oct. 24, 2017

(54) SYSTEM AND METHOD FOR CONTROLLING TORQUE INTERVENTION OF HYBRID ELECTRIC VEHICLE

(71) Applicant: Hyundai Motor Company, Seoul (KR)

(72) Inventors: Joonyoung Park, Seoul (KR); Do Hee Kim, Gyeonggi-do (KR)

(73) Assignee: Hyundai Motor Company, Seoul (KR)

( * ) Notice: Subject to any disclaimer, the term of this patent is extended or adjusted under 35 U.S.C. 154(b) by 124 days.

(21) Appl. No.: 14/941,608

(22) Filed: Nov. 15, 2015

(65) Prior Publication Data

US 2017/0008505 A1   Jan. 12, 2017

(30) Foreign Application Priority Data

Jul. 7, 2015   (KR) .................. 10-2015-0096820

(51) Int. Cl.
*B60W 10/08* (2006.01)
*B60K 6/50* (2007.10)
(Continued)

(52) U.S. Cl.
CPC ............. *B60W 20/10* (2013.01); *B60K 6/46* (2013.01); *B60K 6/48* (2013.01); *B60K 6/50* (2013.01);
(Continued)

(58) Field of Classification Search
CPC ...... B60W 20/00; B60W 20/10; B60W 20/13; B60W 20/15; B60W 20/17; B60W 10/00;
(Continued)

(56) References Cited

U.S. PATENT DOCUMENTS

2005/0060079 A1* 3/2005 Phillips ............... B60K 5/08
701/53
2006/0070779 A1* 4/2006 Kuang ............... B60K 6/445
180/65.235
(Continued)

FOREIGN PATENT DOCUMENTS

JP   2008-068704   3/2008
JP   2013052801 A * 3/2013
(Continued)

*Primary Examiner* — Thomas G Black
*Assistant Examiner* — Sara Lewandroski
(74) *Attorney, Agent, or Firm* — Mintz Levin Cohn Ferris Glovsky and Popeo, P.C.; Peter F. Corless

(57) ABSTRACT

A system and a method for controlling torque intervention of a hybrid electric vehicle including a motor and an engine as power sources that includes: a driving information detector detecting a running state of the vehicle and demand information of a driver of the vehicle; a transmission control unit (TCU) requesting torque reduction while shifting of the vehicle based on a signal from the driving information detector; a traction control system (TCS) requesting torque reduction by outputting an intervention torque for preventing a wheel slip of the vehicle; and a controller controlling torque intervention by dividing a request amount of torque reduction into the engine and the motor when receiving the torque reduction request from the TCU or the TCS, wherein the controller firstly reduces a motor assist torque when a state of the motor before the torque intervention is an assist state, maintains a motor charging torque when the state of the motor before torque intervention is a charging state, and divides an additional reduction requirement in proportion to an available reduction range of the engine and an available reduction range of the motor.

14 Claims, 9 Drawing Sheets

(51) Int. Cl.
  *B60W 20/00* (2016.01)
  *B60W 30/18* (2012.01)
  *B60K 6/46* (2007.10)
  *B60W 10/06* (2006.01)
  *B60W 10/11* (2012.01)
  *B60W 20/10* (2016.01)
  *B60K 6/48* (2007.10)
  *B60W 20/11* (2016.01)

(52) U.S. Cl.
  CPC ............ *B60W 10/06* (2013.01); *B60W 10/08* (2013.01); *B60W 10/11* (2013.01); *B60W 20/00* (2013.01); *B60W 20/11* (2016.01); B60K 2006/4825 (2013.01); B60W 30/18172 (2013.01); B60W 2510/0657 (2013.01); B60W 2510/083 (2013.01); B60W 2520/26 (2013.01); B60W 2540/10 (2013.01); B60W 2540/16 (2013.01); B60W 2710/0666 (2013.01); B60W 2710/083 (2013.01); B60W 2710/1005 (2013.01); B60W 2720/26 (2013.01); B60Y 2200/92 (2013.01); B60Y 2300/182 (2013.01); B60Y 2300/188 (2013.01); B60Y 2300/43 (2013.01); B60Y 2300/60 (2013.01); B60Y 2300/70 (2013.01); Y02T 10/6221 (2013.01); Y02T 10/6252 (2013.01); Y02T 10/6286 (2013.01); Y10S 903/93 (2013.01)

(58) Field of Classification Search
  CPC ...... B60W 10/04; B60W 10/06; B60W 10/08; B60W 30/18172; B60W 2510/0657; B60W 2510/08; B60W 2510/083; B60W 2520/26; B60W 2540/10; B60W 2540/16; B60W 2710/0666; B60W 2710/08; B60W 2710/083; B60K 6/20; B60K 6/485; B60Y 2200/92; B60Y 2300/18175; B60Y 2300/188; Y02T 10/6286; Y10S 903/93
  See application file for complete search history.

(56) References Cited

U.S. PATENT DOCUMENTS

| | | | | |
|---|---|---|---|---|
| 2013/0041533 | A1* | 2/2013 | Kim | B60K 6/365 701/22 |
| 2013/0297126 | A1* | 11/2013 | Yamazaki | B60W 20/40 701/22 |
| 2014/0038772 | A1* | 2/2014 | Dai | B60W 20/106 477/3 |
| 2014/0172219 | A1* | 6/2014 | Nakanishi | B60K 6/48 701/22 |
| 2015/0158484 | A1* | 6/2015 | Sato | B60K 6/445 701/22 |
| 2015/0283996 | A1* | 10/2015 | Wang | B60K 6/547 477/3 |
| 2016/0082945 | A1* | 3/2016 | Kim | B60L 11/1861 701/22 |
| 2016/0280206 | A1* | 9/2016 | Lee | B60W 20/13 |
| 2016/0368477 | A1* | 12/2016 | Du | B60W 10/06 |
| 2017/0001624 | A1* | 1/2017 | Wang | B60W 10/06 |
| 2017/0021824 | A1* | 1/2017 | Johri | B60W 20/19 |
| 2017/0074186 | A1* | 3/2017 | Shin | F02D 41/023 |

FOREIGN PATENT DOCUMENTS

| | | |
|---|---|---|
| KR | 10-0829311 | 5/2008 |
| KR | 10-2010-0056942 A | 5/2010 |
| KR | 20100056942 A * | 5/2010 |
| KR | 10-2010-0062641 A | 6/2010 |
| KR | 10-0992721 B1 | 11/2010 |
| KR | 10-1490954 | 2/2015 |

* cited by examiner

SYSTEM AND METHOD FOR CONTROLLING TORQUE INTERVENTION OF HYBRID ELECTRIC VEHICLE

CROSS-REFERENCE TO RELATED APPLICATION

This application claims priority to and the benefit of Korean Patent Application No. 10-2015-0096820 filed in the Korean Intellectual Property Office on Jul. 7, 2015, the entire contents of which being incorporated herein by reference.

BACKGROUND OF THE DISCLOSURE (a) Technical Field

The present disclosure relates generally to a system and a method for controlling torque intervention of a hybrid electric vehicle. More particularly, the present disclosure relates to a system and a method for controlling torque intervention of a hybrid electric vehicle that divides a request amount of torque reduction by considering a motor state and a ratio of an available reduction range when torque intervention is requested.

(b) Description of the Related Art

As is generally known, a hybrid electric vehicle is driven by an engine which generates torque from fuel combustion and an electric motor which generates torque from an electric battery. The hybrid electric vehicle typically includes a hybrid control unit (HCU) for controlling an engine operation of the hybrid electric vehicle, an engine control unit (ECU) for controlling an operation of an engine, a motor control unit (MCU) for controlling an operation of the driving motor, a transmission control unit (TCU) for controlling an operation of the transmission, and a battery management system (BMS) for managing a condition of a battery. In addition, a traction control system (TCS), which is a safety system for preventing wheel spin and improving driving stability by controlling a brake and an engine while starting out or during acceleration, can be installed in the hybrid electric vehicle.

The hybrid electric vehicle typically performs torque intervention control to divide a request amount of torque reduction into an engine and a motor when the TCU or TCS requests torque reduction. For example, FIG. 1 is a graph showing a conventional method for controlling torque intervention of a hybrid electric vehicle which firstly reduces an engine torque and additionally reduces a motor torque with respect to a shortfall. However, when the torque reduction is continuously requested, a state of charge (SOC) of the battery may be depleted and power performance of the motor may be deteriorated.

FIG. 2 is a graph showing to a conventional method for controlling torque intervention of a hybrid electric vehicle which firstly reduces a motor torque and additionally reduces an engine torque with respect to a shortfall. However, the engine torque is not changed even though torque intervention is requested, engine noise may excessively occur and noise, vibration, and harshness (NVH) performance may be deteriorated.

The above information disclosed in this Background section is only for enhancement of understanding of the background of the disclosure, and therefore, it may contain information that does not form the related art that is already known in this country to a person of ordinary skill in the art.

SUMMARY OF THE DISCLOSURE

The present disclosure has been made in an effort to provide a system and a method for controlling torque intervention of a hybrid electric vehicle having advantages of securing a battery SOC and NVH performance by dividing a request amount of torque reduction according to a motor state and a ratio of an available reduction range when torque intervention is requested.

Embodiments of the present disclosure provide a system for controlling torque intervention of a hybrid electric vehicle including a motor and an engine as power sources that includes: a driving information detector detecting a running state of the vehicle and demand information of a driver of the vehicle; a transmission control unit (TCU) requesting torque reduction while shifting of the vehicle based on a signal from the driving information detector; a traction control system (TCS) requesting torque reduction by outputting an intervention torque for preventing a wheel slip of the vehicle; and a controller controlling torque intervention by dividing a request amount of torque reduction into the engine and the motor when receiving the torque reduction request from the TCU or the TCS, wherein the controller firstly reduces a motor assist torque when a state of the motor before the torque intervention is an assist state, maintains a motor charging torque when the state of the motor before torque intervention is a charging state, and divides an additional reduction requirement in proportion to an available reduction range of the engine and an available reduction range of the motor.

The controller may set the available reduction range of the engine from an engine torque before torque intervention to 0 torque and sets the available reduction range of the motor from 0 torque to a charging limit when the state of the motor before torque intervention is the assist state.

The controller may calculate the additional reduction requirement by subtracting the request amount of torque reduction and a motor torque before torque intervention from a total demand torque before torque intervention when the state of the motor before torque intervention is the assist state.

The controller may set the available reduction range of the engine from the engine torque before torque intervention to 0 torque and the available reduction range of the motor from a charging torque before torque intervention to the charging limit when the state of the motor before torque intervention is the charging state.

The controller may calculate the additional reduction requirement by subtracting the request amount of torque reduction intervention from the total demand torque before torque intervention when the state of the motor before torque intervention is the charging state.

The controller may determine an engine torque after torque intervention and a motor torque after torque intervention as equivalent to the engine torque before torque intervention and the motor torque before torque intervention, respectively, when the request amount of torque reduction is greater than or equal to the total demand torque before torque intervention.

Furthermore, according to embodiments of the present disclosure, a method for controlling torque intervention of a hybrid electric vehicle including a motor and an engine as power sources include: detecting data for controlling torque intervention when torque reduction is requested from a transmission control unit (TCU) of the vehicle or a traction control system (TCS) of the vehicle; determining a state of the motor before torque intervention; reducing a motor assist torque firstly when the state of the motor before torque intervention is an assist state and maintaining a motor charging torque when the state of the motor before torque intervention is a charging state; calculating an additional reduction requirement according to the state of the motor before torque intervention; and setting an available reduction range of the engine and an available reduction range of the motor according to the state of the motor before torque intervention and dividing the additional reduction requirement in proportion to the available reduction ranges of the engine and the motor.

The data may include an engine torque before torque intervention, a motor torque before torque intervention, a request amount of torque reduction, and a charging limit of the motor.

The method may further include determining an engine torque after torque intervention and a motor torque after torque intervention as equivalent to the engine torque before torque intervention and the motor torque before torque intervention, respectively, when the request amount of torque reduction is greater than or equal to a total demand torque before torque intervention which is a sum of the engine torque before torque intervention and the motor torque before torque intervention.

The method may further include, when the state of the motor before torque intervention is the assist state: comparing a value found by subtracting the request amount of torque reduction from total demand torque before torque intervention with the motor toque before torque intervention; determining the engine torque after torque intervention as equivalent to the engine torque before torque intervention; and determining the motor torque after torque intervention as a value found by subtracting the engine torque before torque intervention from the request amount of torque reduction when the value the request amount of torque reduction is less than the motor torque before torque intervention.

The request amount of torque reduction may be calculated by subtracting the request amount of torque reduction and the motor torque before torque intervention from the total demand torque before torque intervention when the value of the request amount of torque reduction is greater than or equal to the motor torque before torque intervention.

The available reduction range of the engine may be set from the engine torque before torque intervention to 0 torque, and the available reduction range of the motor is set from 0 torque to the charging limit when the state of the motor before torque intervention is the assist state.

The request amount of torque reduction may be calculated by subtracting the request amount of torque reduction from the total demand torque before torque intervention when the state of the motor before torque intervention is the charging state.

The available reduction range of the engine may be set from the engine torque before torque intervention to 0 torque, and the available reduction range of the motor is set from a charging torque before torque intervention to the charging limit when the state of the motor before torque intervention is the charging state.

As described above, according to embodiments of the present disclosure, the hybrid electric vehicle firstly reduces the motor assist torque before torque intervention and divides the additional reduction requirement in proportion to the available reduction range of the engine and the available reduction range of the motor, thereby preventing depletion of the battery state of charge (SOC). In addition, the motor charging torque is maintained when the motor state before torque intervention is the charging state, thereby improving charging amount of the motor. Furthermore, the engine torque is reduced along with the motor torque, so the engine noise may be reduced and NVH performance may be improved.

DESCRIPTION OF SYMBOLS

Figure 1:
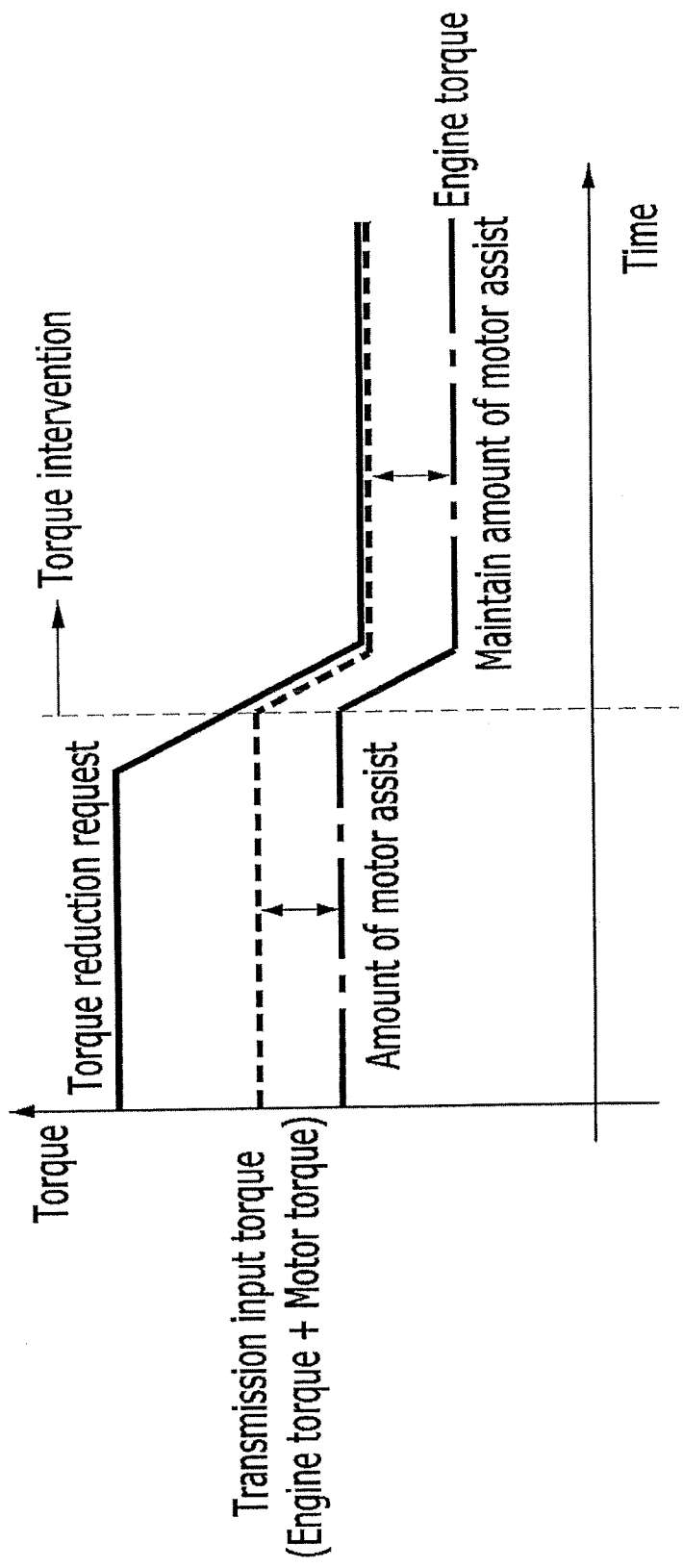
FIG. 1 is a graph showing a conventional method for controlling torque intervention of a hybrid electric vehicle which firstly reduces an engine torque.
Figure 2:
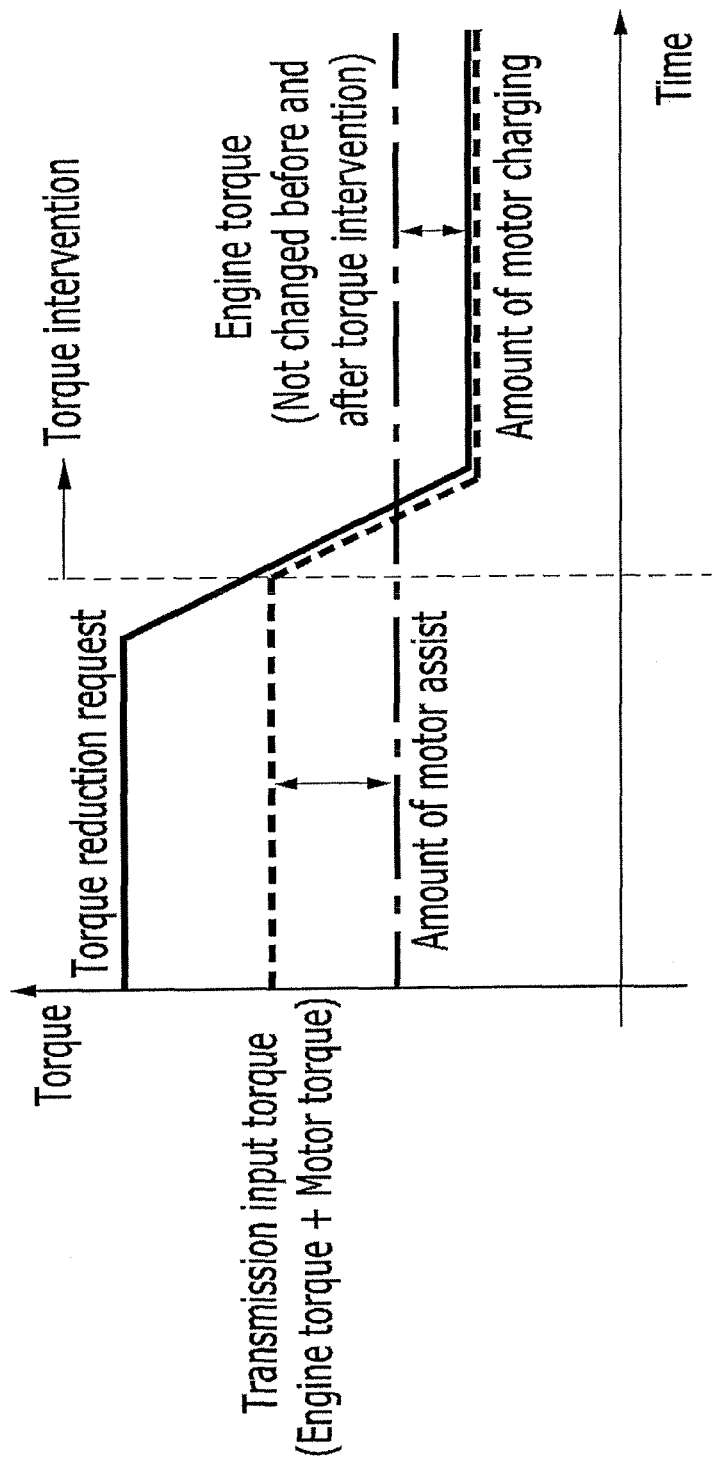
FIG. 2 is a graph showing a conventional method for controlling torque intervention of a hybrid electric vehicle which firstly reduces a motor torque.

10: HCU 12: ECU
14: MCU 16: TCU
20: engine 22: engine clutch
24: motor 26: transmission
28: battery 11: controller
30: driving information detector 32: TCS

DETAILED DESCRIPTION OF THE EMBODIMENTS

In the following detailed description, only certain embodiments of the present disclosure have been shown and described, simply by way of illustration. As those skilled in the art would realize, the described embodiments may be modified in various different ways, all without departing from the spirit or scope of the present disclosure. Accordingly, the drawings and description are to be regarded as illustrative in nature and not restrictive. Like reference numerals designate like elements throughout the specification.

Throughout this specification and the claims which follow, unless explicitly described to the contrary, the word "comprise" and variations such as "comprises" or "comprising" will be understood to imply the inclusion of stated elements but not the exclusion of any other elements. In addition, the terms "-er", "-or", and "module" described in the specification mean units for processing at least one function and operation, and can be implemented by hardware components or software components and combinations thereof.

It is understood that the term "vehicle" or "vehicular" or other similar term as used herein is inclusive of motor vehicles in general including hybrid vehicles, plug-in hybrid electric vehicles, and other alternative fuel vehicles (e.g., fuels derived from resources other than petroleum). As referred to herein, a hybrid electric vehicle is a vehicle that has two or more sources of power, for example, vehicles powered by both gasoline and electricity.

Additionally, it is understood that one or more of the below methods, or aspects thereof, may be executed by at least one controller. The term "controller" may refer to a hardware device that includes a memory and a processor. The memory is configured to store program instructions, and the processor is specifically programmed to execute the program instructions to perform one or more processes which are described further below. Moreover, it is understood that the below methods may be executed by an apparatus comprising the controller in conjunction with one or more other components, as would be appreciated by a person of ordinary skill in the art.

Furthermore, the control logic of the present disclosure may be embodied as non-transitory computer readable media on a computer readable medium containing executable program instructions executed by a processor, a controller, or the like. Examples of computer readable media include, but are not limited to, ROM, RAM, compact disc (CD)-ROMs, magnetic tapes, floppy disks, flash drives, smart cards, and optical data storage devices. The computer readable recording medium can also be distributed in network coupled computer systems so that the computer readable media is stored and executed in a distributed fashion, e.g., by a telematics server or a controller area network (CAN).

Embodiments of the present disclosure will hereinafter be described in detail with reference to the accompanying drawings.

Figure 3:
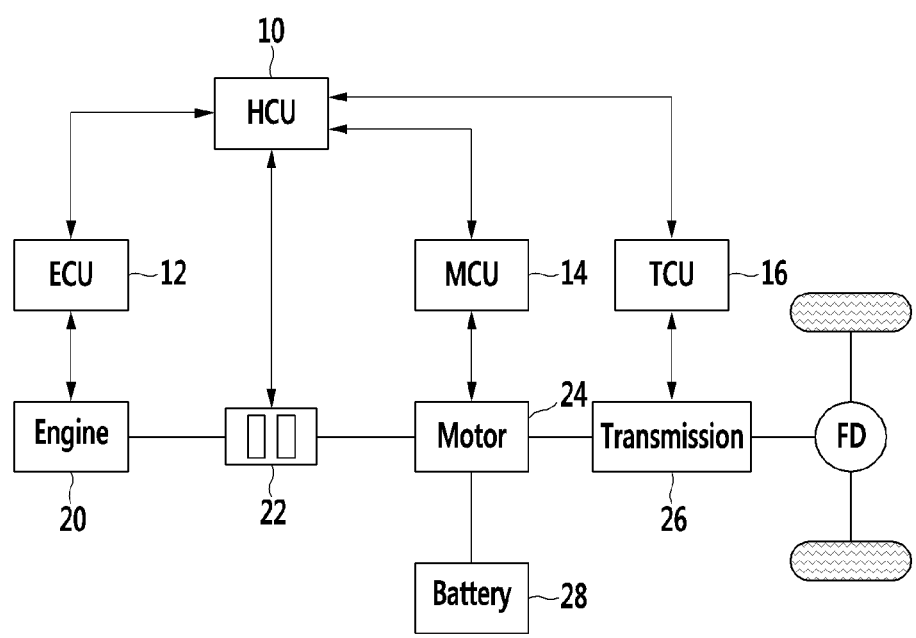
FIG. 3 is a schematic diagram of a hybrid system to which a method for controlling torque intervention of a hybrid electric vehicle is applied according to embodiments of the present disclosure.

FIG. 3 is a schematic diagram of a hybrid system to which a method for controlling torque intervention of a hybrid electric vehicle is applied according to embodiments of the present disclosure.

The hybrid system as shown in FIG. 3 is illustrated for better comprehension and ease of description. Therefore, a method for controlling torque intervention of a hybrid electric vehicle according to embodiments of the present disclosure may not only be applied to the hybrid system as shown in FIG. 3, but may also be applied to all other hybrid systems.

As shown in FIG. 3, the hybrid system to which a method for controlling torque intervention of a hybrid electric vehicle is applied according to the present disclosure includes, for example, a hybrid control unit (HCU) 10, an electronic control unit (ECU) 12, a motor control unit (MCU) 14, a transmission control unit (TCU) 16, an engine 20, an engine clutch 22, a motor 24, a transmission 26, and a battery 28.

The HCU 10 controls operation of other controllers which mutually exchange information in an entire operation of a hybrid electric vehicle, so that the HCU 10 controls output torque of the engine 20 and the motor 24 by cooperating with the other controllers.

The ECU 12 controls an entire operation of the engine 20 according to conditions of the engine 20, such as a demand torque of a driver, a coolant temperature, and an engine torque.

The MCU 14 controls an entire operation of the motor 24 according to a demand torque of a driver, a driving mode of the hybrid electric vehicle, and an SOC condition of the battery 28.

The TCU 16 controls an entire operation of the transmission 26 such as speed ratios of the transmission 26 depending on output torque of the engine 20 and the motor 24, and an amount of regenerative braking.

The engine 20 outputs power as a power source while turned on.

The engine clutch 22 is disposed between the engine 20 and the motor 24 to receive a control signal of the HCU 10, and selectively connects the engine 20 and the motor 24 according to a driving mode of the hybrid electric vehicle.

The motor 24 is operated by a 3-phase AC voltage applied from the battery 28 through an inverter to generate torque, and operates as a power generator and supplies regenerative energy to the battery 28 in a coast-down mode.

The transmission 26 supplies a sum of an output torque of the engine 20 and an output torque of the motor 24 determined by coupling and releasing of the engine clutch 22 as an input torque and selects any shift gear according to a vehicle speed and a driving condition to output driving force to a driving wheel and maintain driving.

The battery 28 is composed of a plurality of unit cells, and stores a high voltage for supplying a voltage to the motor 24, for example, 400 V or 450 V DC.

A detailed explanation of the hybrid system as described above is unnecessary for the purposes of the present disclosure and will be omitted.

Figure 4:
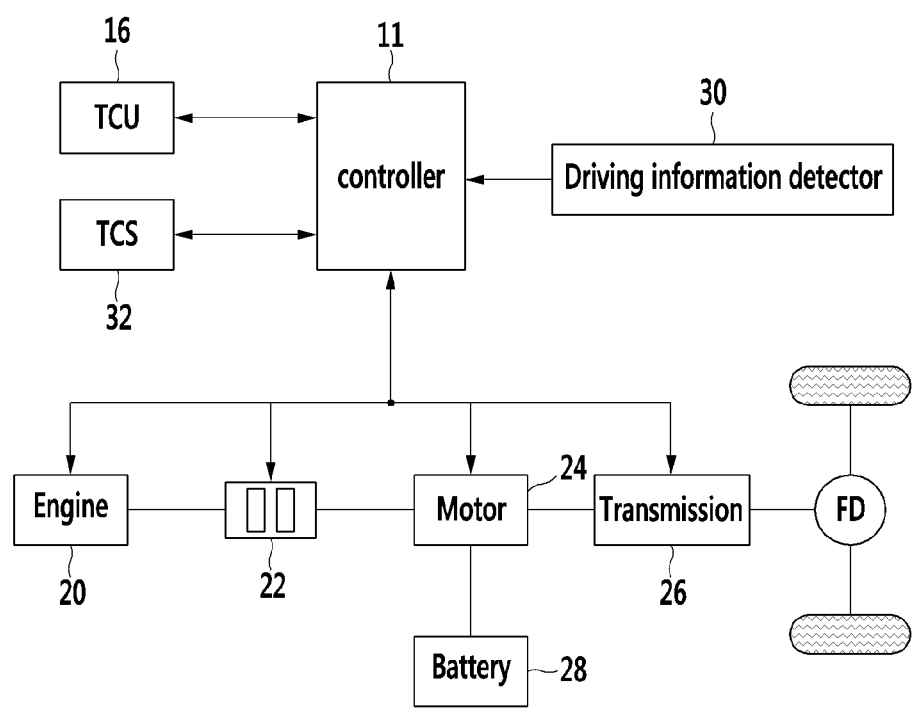
FIG. 4 is a block diagram of a system for controlling torque intervention of a hybrid electric vehicle according to embodiments of the present disclosure.

FIG. 4 is a block diagram of a system for controlling torque intervention of a hybrid electric vehicle according to embodiments of the present disclosure.

As shown in FIG. 4, a system for controlling torque intervention of a hybrid electric vehicle according to the present disclosure includes a driving information detector 30, a TCU 16, a TCS 32, a controller 11, an engine 20, and a motor 24.

Some processes in the method for controlling torque intervention of the hybrid electric vehicle according to embodiments of the present disclosure to be described below may be performed by the ECU 12 and the MCU 14, and some other processes may be performed by the HCU 10. Accordingly, for convenience of description, in this specification and claims, many controllers provided in the hybrid electric vehicle, such as the ECU 12, the MCU 14, and the HCU 10, are referred to herein as the controller 11.

The hybrid electric vehicle to which embodiments of the present disclosure are applied includes at least one engine 20 and at least one motor 24. In addition, the hybrid electric vehicle provides a driving mode in which the engine 20 and the motor 24 operate separately or simultaneously as a power source. For this purpose, the engine clutch is disposed between the engine 20 and the motor 24 to selectively connect the engine 20 and the motor 24.

The driving information detector 30 detects a running state of the hybrid electric vehicle and demand information of a driver by receiving signals from a vehicle speed sensor detecting a vehicle speed, a motor speed sensor detecting a motor speed, an engine speed sensor detecting an engine speed, an accelerator pedal position sensor (APS) detecting a positon value of an accelerator pedal, a brake pedal position sensor (BPS) detecting a position value of a brake pedal, and a battery management system (BMS) detecting a charging state of the battery.

The controller 11 may determine whether the hybrid electric vehicle is in an electric vehicle (EV) mode or a hybrid electric vehicle (HEV) mode in accordance with coupling of the engine clutch 22 based on a signal from the driving information detector 30.

The TCU 16 requests torque reduction to the controller 11 while shifting in order to secure drivability.

The TCS 32 requests torque reduction by outputting an intervention torque when wheel spin occurs because the hybrid electric vehicle starts out or accelerates on a slippery road.

The controller 11 performs torque intervention control to divide a request amount of torque reduction into the engine 20 and the motor 24 when receiving the torque reduction request from the TCU 16 or the TCS 32.

Figure 5:
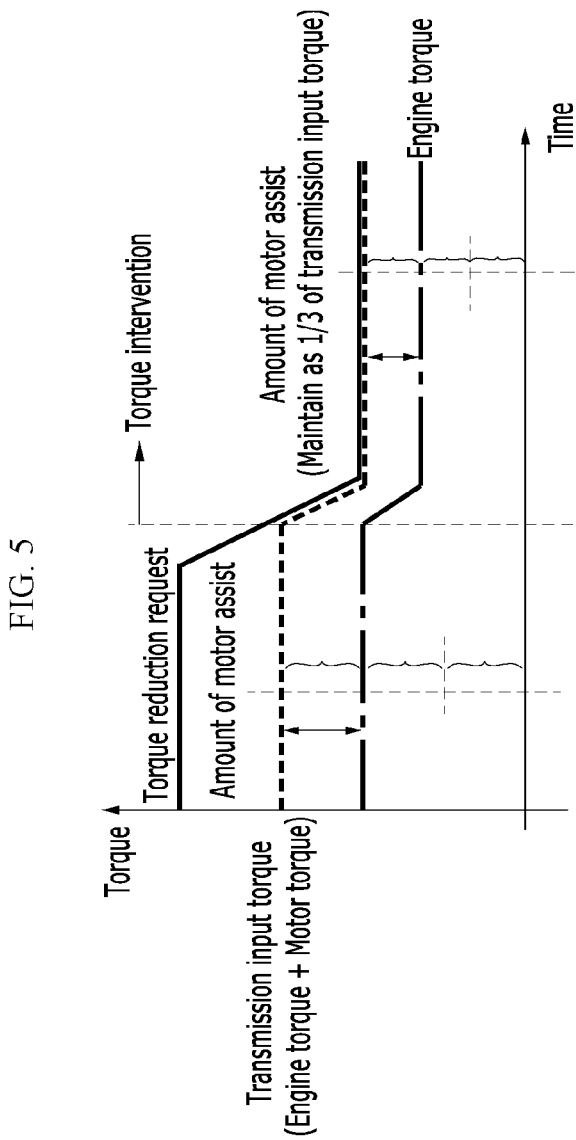
FIG. 5 is a graph showing a torque according to a method for controlling torque intervention of a hybrid electric vehicle which simultaneously reduces an engine torque and a motor torque.

For example, FIG. 5 is a graph showing a torque according to a method for controlling torque intervention of a hybrid electric vehicle which simultaneously reduces an engine torque and a motor torque. As shown in FIG. 5, when torque reduction of the hybrid electric vehicle is requested, the controller 11 performs torque intervention control that simultaneously reduces the engine torque and the motor torque with the same proportion.

The method of simultaneously reducing the engine torque and the motor torque may decrease engine noise compared to the conventional method; however, the battery SOC may be depleted when the torque reduction is continuously requested.

To solve this problem, the controller 11 according to embodiments of the present disclosure confirms a state of the motor 24 (i.e., "motor state") before torque intervention, and divides a request amount of torque reduction into the engine 20 and the motor 24 according to the motor state before torque intervention. That is, the controller 11 firstly reduces a motor assist torque when a motor state before torque intervention is an assist state. On the other hand, the controller 11 maintains a motor charging torque when the motor state before torque intervention is a charging state. After that, the controller 11 performs torque intervention control that divides an additional reduction requirement in proportion to an available reduction range of the engine and an available reduction range of the motor.

The torque intervention control by the controller 11 according to embodiments of the present disclosure will be described in more detail with reference to FIG. 6 and FIG. 7.

Figure 6:
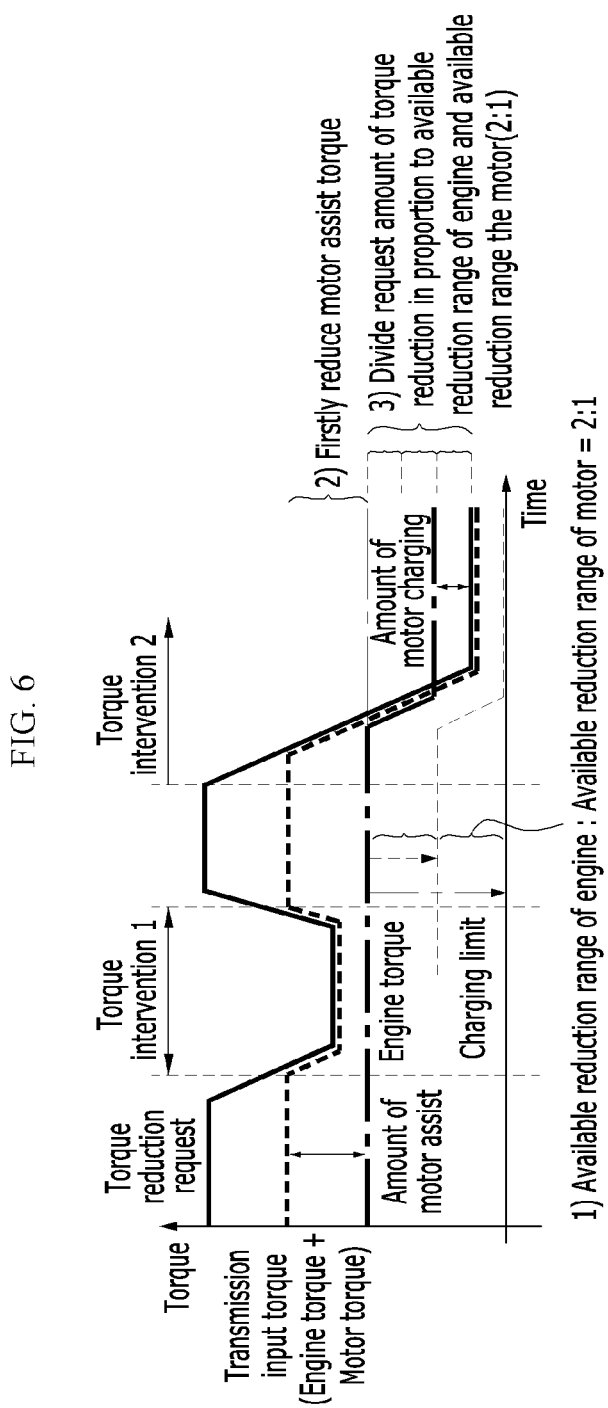
FIG. 6 is a graph showing a torque to which a method for controlling torque intervention of a hybrid electric vehicle according to embodiments of the present disclosure is applied when a motor state is an assist state.

FIG. 6 is a graph showing a torque to which a method for controlling torque intervention of a hybrid electric vehicle according to embodiments of the present disclosure is applied when a motor state is an assist state.

As shown in FIG. 6, the controller 11 according to the present disclosure confirms a motor state before torque intervention when receiving the torque reduction request from the TCU 16 or the TCS 32.

When the motor state before torque intervention is an assist state, the controller 11 firstly reduces a motor assist torque until the motor assist torque is exhausted. If the request amount of torque reduction is not satisfied by the motor assist torque, the controller 11 divides an additional reduction requirement in proportion to an available reduction range of the engine and an available reduction range of the motor. At this time, the engine 20 may be controlled from 0 torque to an engine torque before torque intervention, so the available reduction range of the engine may be set from the engine torque before torque intervention to 0 torque.

On the contrary, the motor 24 may be controlled from a charging limit to 0 torque, so the available reduction range of the motor may be set from 0 torque to the charging limit. In addition, as shown in FIG. 6, an available reduction ratio between the engine 20 and the motor 24 is determined as 2:1. Therefore, the controller 11 firstly reduces the motor assist torque and divides the additional reduction requirement according to the available reduction ratio of 2:1.

Figure 7:
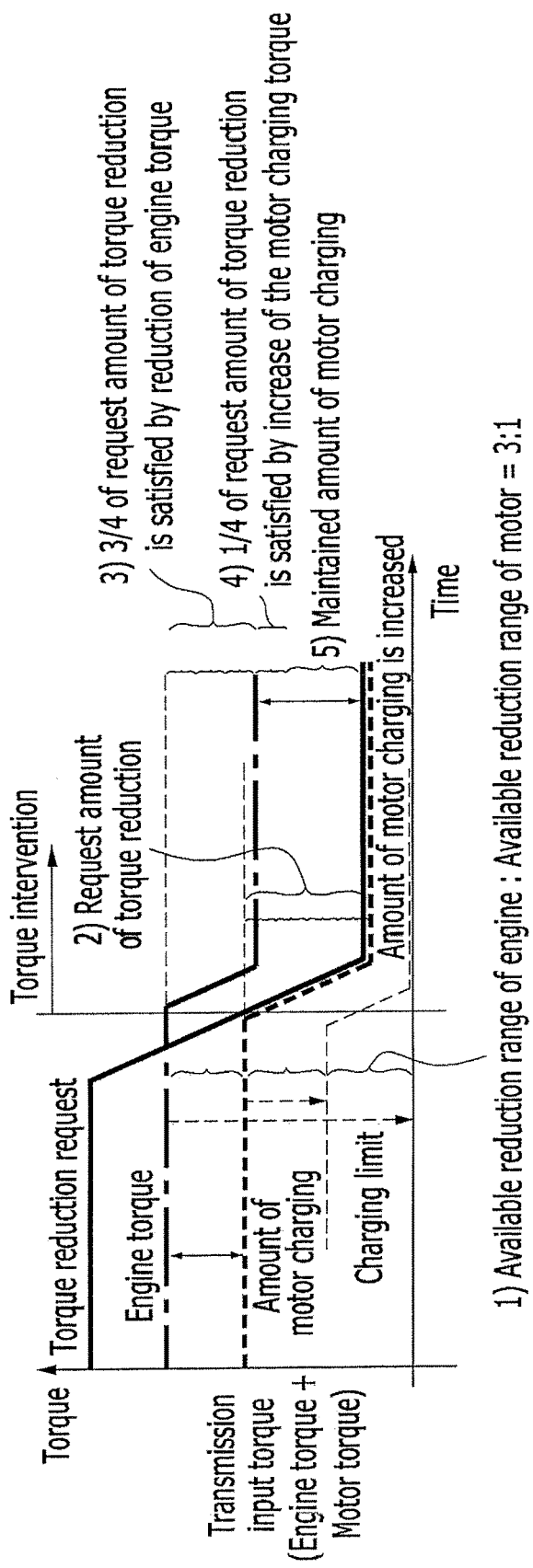
FIG. 7 is a graph showing a torque to which a method for controlling torque intervention of a hybrid electric vehicle according to embodiments of the present disclosure is applied when a motor state is a charging state.

FIG. 7 is a graph showing a torque to which a method for controlling torque intervention of a hybrid electric vehicle according to embodiments of the present disclosure is applied when a motor state is in a charging state.

As shown in FIG. 7, the controller 11 according to embodiments of the present disclosure maintains a motor charging torque when the motor state before torque intervention is a charging state, and divides the request amount of torque reduction in proportion to an available reduction range of the engine and an available reduction range of the motor.

At this time, the engine 20 may be controlled from 0 torque to an engine torque before torque intervention, so the available reduction range of the engine may be set from the engine torque before torque intervention to 0 torque. On the other hand, the motor 24 may be controlled from a charging limit to a charging torque before torque intervention, so the available reduction range of the motor may be set from the charging torque before torque intervention to the charging limit.

In addition, as shown in FIG. 7, an available reduction ratio between the engine 20 and the motor 24 is determined as 3:1. Therefore, the controller 11 maintains the motor charging torque before torque intervention and divides the request amount of torque reduction according to the available reduction ratio 3:1. That is, the controller 11 may satisfy ¾ of the request amount of torque reduction by reduction of the engine torque and ¼ of the request amount of torque reduction by increase of the motor charging torque.

As described above, the motor charging torque is maintained when the motor state before torque intervention is the charging state, thereby improving charging amount of the motor. Thus, battery SOC may be effectively managed. For these purposes, the controller 11 may be implemented as at least one processor that is operated by a predetermined program, and the predetermined program may be programmed in order to perform each step of a method for controlling torque intervention of a hybrid electric vehicle according to an exemplary of the present disclosure.

Various embodiments described herein may be implemented within a recording medium that may be read by a computer or a similar device by using software, hardware, or a combination thereof, for example. According to a hardware implementation, the embodiments described herein may be implemented by using at least one of application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, and electric units designed to perform any other functions. According to a software implementation, embodiments such as procedures and functions described in the present embodiments may be implemented by separate software modules. Each of the software modules may perform one or more functions and operations described in the present disclosure. A software code may be implemented by a software application written in an appropriate program language.

Hereinafter, a method for controlling torque intervention of the hybrid electric vehicle according to embodiments of the present disclosure will be described in detail with reference to FIG. 8 and FIG. 9.

Figure 8:
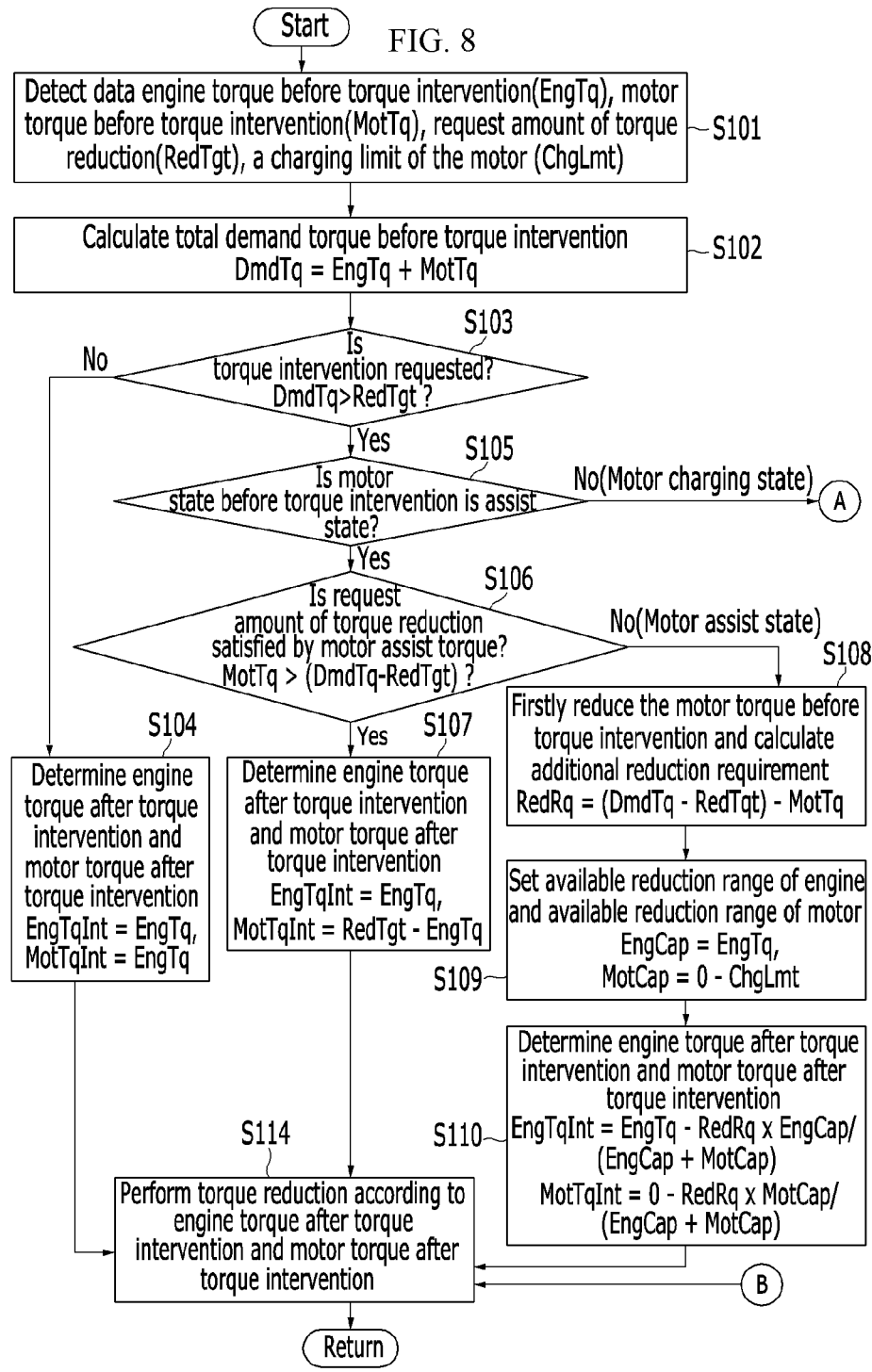
FIG. 8 and FIG. 9 are flowcharts showing a method for controlling torque intervention of a hybrid electric vehicle according to embodiments of the present disclosure.
Figure 9:
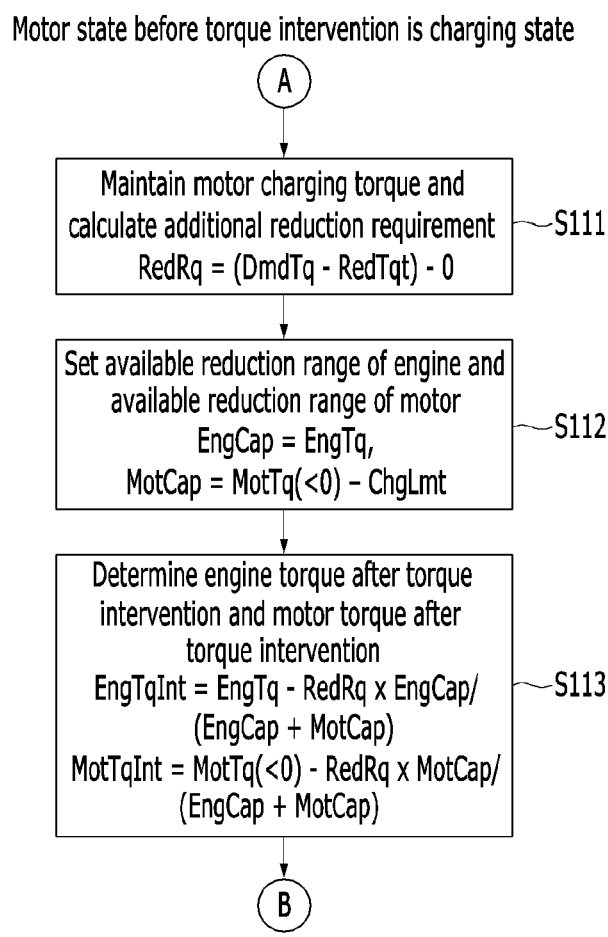

FIG. 8 and FIG. 9 are flowcharts showing a method for controlling torque intervention of a hybrid electric vehicle according to embodiments of the present disclosure.

As shown in FIG. 8 and FIG. 9, a method for controlling torque intervention of a hybrid electric vehicle according to the present disclosure starts with detecting data for controlling torque intervention when torque reduction is requested from the TCU 16 or the TCS 32 at step S101. That is, the controller 11 may detect an engine torque before torque intervention EngTq, motor torque before torque intervention MotTq, a request amount of torque reduction RedTgt, and a charging limit of the motor ChgLmt.

When the data are detected at the step S101, the controller 11 calculates a total demand torque before torque intervention DmdTq by adding the engine torque before torque intervention EngTq and the motor torque before torque intervention MotTq at step S102.

After that, the controller 11 compares the total demand torque before torque intervention DmdTq with the request amount of torque reduction RedTgt when torque intervention is requested at step S103.

When the total demand torque before torque intervention DmdTq is less than or equal to the request amount of torque reduction RedTgt at the step S103, the controller 11 determines an engine torque after torque intervention EngTqInt and a motor torque after torque intervention MotTqInt as the same as the engine torque before torque intervention EngTq and motor torque before torque intervention MotTq at step S104.

On the other hand, when the total demand torque before torque intervention DmdTq is greater than the request amount of torque reduction RedTgt at the step S103, the controller 11 determines whether a motor state before torque intervention is an assist state or a charging state at step S105.

When the motor state before torque intervention is the assist state at the step S105, the controller 11 determines whether the request amount of torque reduction RedTgt is satisfied by the motor assist torque at step S106.

When a value found by subtracting the request amount of torque reduction RedTgt from the total demand torque before torque intervention DmdTq is less than or equal to the motor torque before torque intervention MotTq at the step S106, the controller 11 determines that the request amount of torque reduction RedTgt is satisfied by the motor torque before torque intervention MotTq. Thus, the controller 11 determines an engine torque after torque intervention and a motor torque after torque intervention at step S107. That is, the controller 11 may determine the engine torque after torque intervention EngTqInt as the same as the engine torque before torque intervention EngTq, and may determine the motor torque after torque intervention MotTqInt as a value found by subtracting the engine torque before torque intervention EngTq from the request amount of torque reduction RedTgt.

On the other hand, when a value found by subtracting the request amount of torque reduction RedTgt from the total demand torque before torque intervention DmdTq is greater than the motor torque before torque intervention MotTq at the step S106, the controller 11 determines that the request amount of torque reduction RedTgt is not satisfied by only the motor torque before torque intervention MotTq. Therefore, the controller 11 firstly reduces the motor torque before torque intervention MotTq, and calculates an additional reduction requirement by the following Equation 1 at step S108.

$$RedRq=(DmdTq-RedTqt)-MotTq \qquad \text{(Equation 1)}$$

The additional reduction requirement RedRq may be calculated by subtracting the motor torque before torque intervention MotTq from a value found by subtracting the request amount of torque reduction RedTgt from the total demand torque before torque intervention DmdTq.

After that, the controller 11 sets an available reduction range of the engine and an available reduction range of the motor when the motor state before torque intervention is the assist state at step S109.

Herein, the available reduction ranges of the engine and the motor mean available amount of torque reduction of the engine 20 and the motor 24 before torque intervention. The engine 20 may reduce a whole torque before torque intervention, so the available reduction range of the engine EngCap may set as the same as the engine torque before torque intervention EngTq (EngCap=EngTq).

In addition, the motor 24 reduces the motor assist torque to 0 torque in advance, and the available reduction range of the motor MotCap may be set from 0 torque to the charging limit (MotCap=0−ChgLmt).

The controller 11 determines an engine torque after torque intervention and a motor torque after torque intervention to divide the additional reduction requirement RedTq in proportion to the available reduction range of the engine EngCap and the available reduction range of the motor MotCap at step S110. At this time, the engine torque after torque intervention EngTqInt may be calculated by the following Equation 2.

$$EngTqInt=EngTq-RedRq\times EngCap/(EngCap+MotCap) \qquad \text{(Equation 2)}$$

Herein, EngTqInt is the engine torque after torque intervention, EngTq is the engine torque before torque intervention, RedRq is the additional reduction requirement, EngCap is the available reduction range of the engine, and MotCap is the available reduction range of the motor.

In addition, the motor torque after torque intervention MotTqInt may be calculated by the following Equation 3.

$$MotTqInt=0-RedRq\times MotCap/(EngCap+MotCap) \qquad \text{(Equation 3)}$$

After that, the controller 11 performs torque reduction according to the determined engine torque after torque intervention and the motor torque after torque intervention at step S114.

Meanwhile, a case in which the motor state before torque intervention is the charging state at the step S105 will be described with reference to FIG. 9. The controller 11 maintains the motor charging torque and calculates the additional reduction requirement by the following Equation 4 at step S111.

$$RedRq=(DmdTq-RedTqt)-0 \qquad \text{(Equation 4)}$$

Herein, the additional reduction requirement RedRq may be calculated by subtracting 0 from a value found by subtracting the request amount of torque reduction RedTgt from the total demand torque before torque intervention DmdTq.

The controller 11 sets an available reduction range of the engine and an available reduction range of the motor when the motor state before torque intervention is the charging state at step S112. The engine 20 may reduce a whole torque before torque intervention, so the available reduction range of the engine EngCap may set as the same as the engine torque before torque intervention EngTq (EngCap=EngTq).

In addition, the motor 24 may reduce torque as much as the charging limit, so the available reduction range of the motor MotCap may be set from the charging torque before torque intervention MotTq (<0) to the charging limit ChgLmt (MotCap=MotTq<0−ChgLmt).

The controller 11 determines an engine torque after torque intervention and a motor torque after torque intervention to divide the additional reduction requirement RedTq in proportion to the available reduction range of the engine EngCap and the available reduction range of the motor MotCap at step S113.

At this time, the engine torque after torque intervention EngTqInt may be calculated by the Equation 2 above. In addition, the motor torque after torque intervention MotTqInt may be calculated by the following Equation 5.

MotTqInt=MotTq(<0)−RedRq×MotCap/(EngCap+ MotCap)  (Equation 5)

After that, the controller 11 performs torque reduction according to the determined engine torque after torque intervention and the motor torque after torque intervention at step S114.

As described above, according to embodiments of the present disclosure, the hybrid electric vehicle firstly reduces the motor assist torque before torque intervention and divides the additional reduction requirement in proportion to the available reduction range of the engine and the available reduction range of the motor, thereby preventing depletion of the battery SOC. In addition, the motor charging torque is maintained when the motor state before torque intervention is the charging state, thereby improving charging amount of the motor. Furthermore, the engine torque is reduced along with the motor torque, so the engine noise may be reduced and NVH performance may be improved.

While this disclosure has been described in connection with what is presently considered to be practical embodiments, it is to be understood that the disclosure is not limited to the disclosed embodiments, but, on the contrary, is intended to cover various modifications and equivalent arrangements included within the spirit and scope of the appended claims.

What is claimed is:

1. A system for controlling torque intervention of a hybrid electric vehicle including a motor and an engine as power sources, comprising:
    a driving information detector detecting a running state of the vehicle and demand information of a driver of the vehicle;
    a transmission control unit (TCU) requesting torque reduction while shifting of the vehicle based on a signal from the driving information detector;
    a traction control system (TCS) requesting torque reduction by outputting an intervention torque for preventing a wheel slip of the vehicle; and
    a controller controlling torque intervention by dividing a request amount of torque reduction into the engine and the motor when receiving the torque reduction request from the TCU or the TCS,
    wherein the controller firstly reduces a motor assist torque when a state of the motor before the torque intervention is an assist state, maintains a motor charging torque when the state of the motor before the torque intervention is a charging state, and divides an additional reduction requirement in proportion to an available reduction range of the engine and an available reduction range of the motor.

2. The system of claim 1, wherein the controller sets the available reduction range of the engine from an engine torque before torque intervention to 0 torque and sets the available reduction range of the motor from 0 torque to a charging limit when the state of the motor before torque intervention is the assist state.

3. The system of claim 1, wherein the controller calculates the additional reduction requirement by subtracting the request amount of torque reduction and a motor torque before torque intervention from a total demand torque before torque intervention when the state of the motor before torque intervention is the assist state.

4. The system of claim 1, wherein the controller sets the available reduction range of the engine from the engine torque before torque intervention to 0 torque and the available reduction range of the motor from a charging torque before torque intervention to the charging limit when the state of the motor before torque intervention is the charging state.

5. The system of claim 1, wherein the controller calculates the additional reduction requirement by subtracting the request amount of torque reduction intervention from the total demand torque before torque intervention when the state of the motor before torque intervention is the charging state.

6. The system of claim 1, wherein the controller determines an engine torque after torque intervention and a motor torque after torque intervention as equivalent to the engine torque before torque intervention and the motor torque before torque intervention, respectively, when the request amount of torque reduction is greater than or equal to the total demand torque before torque intervention.

7. A method for controlling torque intervention of a hybrid electric vehicle including a motor and an engine as power sources, comprising:
    detecting data for controlling torque intervention when torque reduction is requested from a transmission control unit (TCU) of the vehicle or a traction control system (TCS) of the vehicle;
    determining a state of the motor before torque intervention;
    reducing a motor assist torque firstly when the state of the motor before torque intervention is an assist state and maintaining a motor charging torque when the state of the motor before torque intervention is a charging state;
    calculating an additional reduction requirement according to the state of the motor before torque intervention; and
    setting an available reduction range of the engine and an available reduction range of the motor according to the state of the motor before torque intervention and dividing the additional reduction requirement in proportion to the available reduction ranges of the engine and the motor.

8. The method of claim 7, wherein the data includes an engine torque before torque intervention, a motor torque before torque intervention, a request amount of torque reduction, and a charging limit of the motor.

9. The method of claim 7, further comprising determining an engine torque after torque intervention and a motor torque after torque intervention as equivalent to the engine torque before torque intervention and the motor torque before torque intervention, respectively, when the request amount of torque reduction is greater than or equal to a total demand torque before torque intervention which is a sum of the engine torque before torque intervention and the motor torque before torque intervention.

10. The method of claim 7, further comprising, when the state of the motor before torque intervention is the assist state:

comparing a value found by subtracting the request amount of torque reduction from total demand torque before torque intervention with the motor toque before torque intervention;

determining the engine torque after torque intervention as equivalent to the engine torque before torque intervention; and determining the motor torque after torque intervention as a value found by subtracting the engine torque before torque intervention from the request amount of torque reduction when the value the request amount of torque reduction is less than the motor torque before torque intervention.

11. The method of claim 10, wherein the request amount of torque reduction is calculated by subtracting the request amount of torque reduction and the motor torque before torque intervention from the total demand torque before torque intervention when the value of the request amount of torque reduction is greater than or equal to the motor torque before torque intervention.

12. The method of claim 7, wherein the available reduction range of the engine is set from the engine torque before torque intervention to 0 torque, and the available reduction range of the motor is set from 0 torque to the charging limit when the state of the motor before torque intervention is the assist state.

13. The method of claim 7, wherein the request amount of torque reduction is calculated by subtracting the request amount of torque reduction from the total demand torque before torque intervention when the state of the motor before torque intervention is the charging state.

14. The method of claim 7, wherein the available reduction range of the engine is set from the engine torque before torque intervention to 0 torque, and the available reduction range of the motor is set from a charging torque before torque intervention to the charging limit when the state of the motor before torque intervention is the charging state.

* * * * *